(12) United States Patent
Yen et al.

(10) Patent No.: US 10,481,443 B2
(45) Date of Patent: Nov. 19, 2019

(54) DISPLAY PANEL

(71) Applicant: InnoLux Corporation, Miao-Li County (TW)

(72) Inventors: Chung-Wen Yen, Miao-Li County (TW); Yi-Chen Hsiao, Miao-Li County (TW); Chao-Hsiang Wang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/266,365

(22) Filed: Feb. 4, 2019

(65) Prior Publication Data
US 2019/0171055 A1   Jun. 6, 2019

Related U.S. Application Data

(63) Continuation of application No. 15/174,771, filed on Jun. 6, 2016, now Pat. No. 10,241,367.

(30) Foreign Application Priority Data

Jun. 24, 2015 (TW) .............................. 104120260 A

(51) Int. Cl.
*G02B 5/22* (2006.01)
*G02F 1/1339* (2006.01)
(Continued)

(52) U.S. Cl.
CPC .... *G02F 1/13394* (2013.01); *G02F 1/133512* (2013.01); *G02F 1/133514* (2013.01);
(Continued)

(58) Field of Classification Search
CPC .. G02B 5/201; G02B 5/20; G02B 5/22; G02F 1/133514; G02F 1/133516; G02F 1/133512; G02F 2001/133519
(Continued)

(56) References Cited

U.S. PATENT DOCUMENTS 7,050,140 B2 * 5/2006 Yanagawa ......... G02F 1/133707
349/106
7,518,664 B2 * 4/2009 Mather .............. G02B 27/2214
349/15
(Continued)

FOREIGN PATENT DOCUMENTS

JP   2011-186279   9/2011
JP   2013-007955   1/2013

OTHER PUBLICATIONS

Notice of Reasons for Rejection issued by the Japan Patent Office for corresponding Japanese Patent Application No. 2016-078180 dated Apr. 4, 2017.

*Primary Examiner* — William R Alexander
*Assistant Examiner* — Tamara Y. Washington
(74) *Attorney, Agent, or Firm* — McClure, Qualey & Rodack, LLP

(57) ABSTRACT

A display panel is provided. The display panel includes a first substrate; a second substrate; a shielding layer; a first color filter; and a spacer. The second substrate is disposed opposite the first substrate. The shielding layer is disposed over the second substrate, wherein the shielding layer includes two shielding pattern rows projected onto the second substrate. The first color filter is disposed over the second substrate and the shielding layer. The spacer is disposed over the first color filter, wherein the spacer includes a spacer pattern projected onto the second substrate, and the spacer pattern overlaps one of the two shielding pattern rows, and the one of the two shielding pattern rows includes an expansion portion, wherein the expansion portion has an edge and at least part of the edge is curved.

18 Claims, 12 Drawing Sheets

(51) Int. Cl.
*G02F 1/1335* (2006.01)
*G02F 1/1333* (2006.01)

(52) U.S. Cl.
CPC .............. *G02F 2001/13396* (2013.01); *G02F 2001/133357* (2013.01)

(58) Field of Classification Search
USPC ........ 359/237–240, 242, 245–246, 250–252, 359/265–271, 290–298; 349/38–40; 345/107
See application file for complete search history.

(56) References Cited

U.S. PATENT DOCUMENTS

| | | | | |
|---|---|---|---|---|
| 7,633,595 | B2 * | 12/2009 | Kim | .................. G02F 1/133707 349/106 |
| 2005/0179853 | A1 * | 8/2005 | Chen | .................. G02F 1/13394 349/155 |
| 2006/0028598 | A1 * | 2/2006 | Lee | .................. G02F 1/133514 349/107 |
| 2006/0187401 | A1 * | 8/2006 | Yun | ..................... G02F 1/13394 349/158 |
| 2016/0004129 | A1 * | 1/2016 | Yang | ................. G02F 1/133512 349/106 |

* cited by examiner

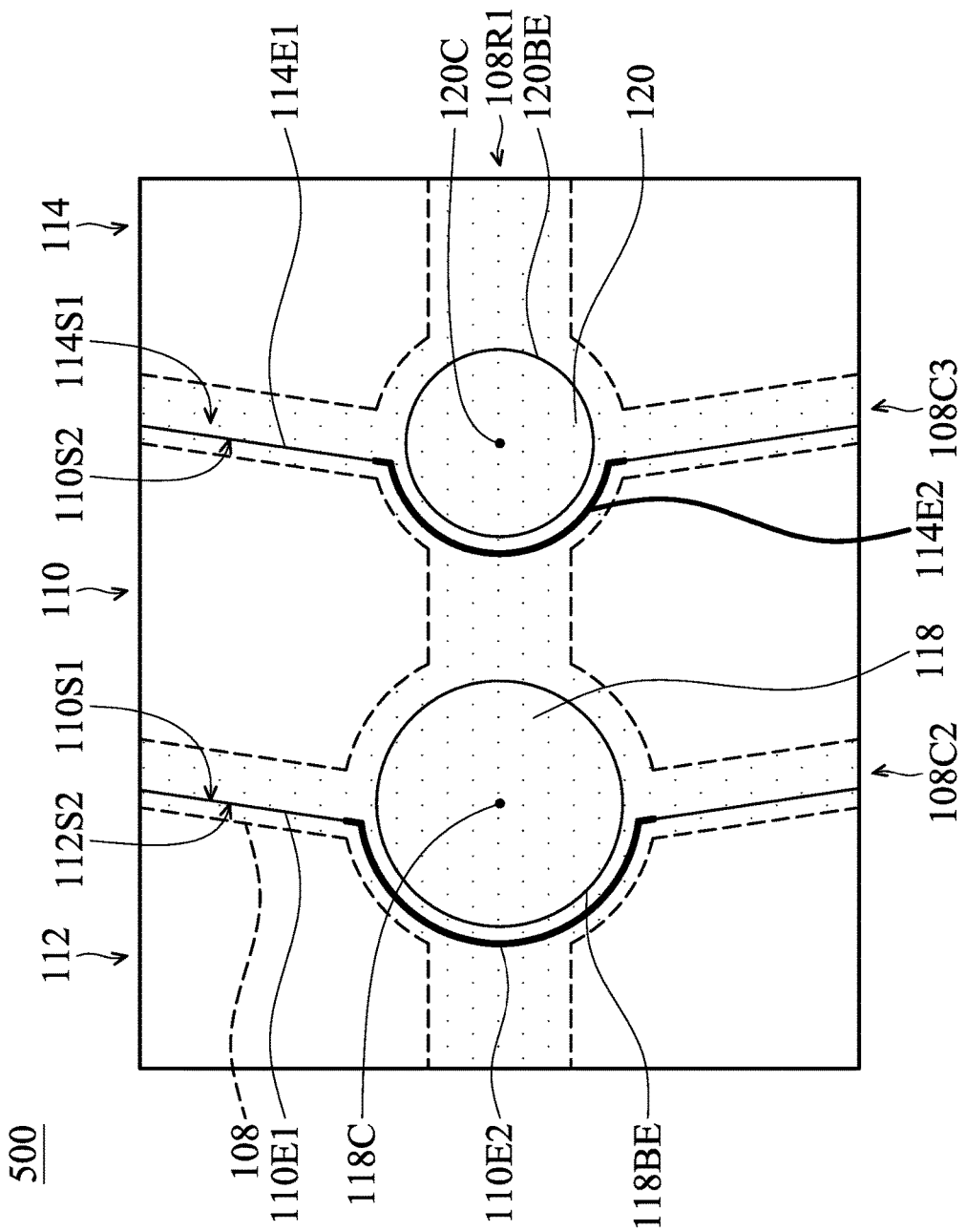

DISPLAY PANEL

CROSS REFERENCE TO RELATED APPLICATIONS

This application is a Continuation of application Ser. No. 15/174,771, filed Jun. 6, 2016, which claims priority of Taiwan Patent Application No. 104120260, filed on Jun. 24, 2015, the entirety of which is incorporated by reference herein.

BACKGROUND

Technical Field

The disclosure relates to a display panel, and in particular to a display panel with a color filter.

Description of the Related Art

Display devices are becoming more widely used in the display elements of various products. Liquid-crystal molecules have different light polarization or light refraction effects at different alignment configurations, and liquid-crystal display devices utilize this characteristic to control light penetration to generate images.

Various liquid-crystal display devices with wide-angles and high aperture ratios have been developed, such as an in-plane switching liquid-crystal display device or a fringe-field switching liquid-crystal display device. However, while the display devices have been developed to be thinner, lighter, smaller and more fashionable, the yield may be lower.

SUMMARY

The present disclosure provides a display panel, including: a first substrate; a second substrate disposed opposite the first substrate; a shielding layer disposed over the second substrate, wherein the shielding layer includes two shielding pattern rows projected onto the second substrate; a first color filter disposed over the second substrate and the shielding layer; and a spacer disposed over the first color filter, wherein the spacer includes a spacer pattern projected onto the second substrate, and the spacer pattern overlaps one of the two shielding pattern rows, wherein the first color filter includes a first side projected onto the second substrate, wherein the first side includes a first portion located between the two shielding pattern rows and a second portion overlapped one of the two shielding pattern rows, wherein the first portion connects the second portion, wherein a shortest distance between an extension line of the first portion and a center of the spacer pattern is a first distance, and a shortest distance between the second portion and the center of the spacer pattern is a second distance, wherein the first distance is shorter than the second distance.

The present disclosure also provides a display panel, including: a first substrate; a second substrate disposed opposite the first substrate; a shielding layer disposed over the second substrate, wherein the shielding layer includes two shielding pattern rows projected onto the second substrate; a first color filter disposed over the second substrate; and a spacer disposed over the first color filter, wherein the spacer includes a spacer pattern projected onto the second substrate, and the spacer pattern overlaps one of the two shielding pattern rows, wherein the first color filter has a first side projected onto the second substrate, wherein the first side includes a first portion located between the two shielding pattern rows and a second portion overlapped one of the two shielding pattern rows, wherein the first portion connects the second portion, wherein a portion of the first portion is a line extending along the data line, and the second portion is a line curved along an edge of the spacer pattern.

The present disclosure also provides a display panel, including: a first substrate; a second substrate disposed opposite the first substrate; a shielding layer disposed over the second substrate, wherein the shielding layer includes two shielding pattern rows projected onto the second substrate; a first color filter disposed over the second substrate and the shielding layer; and a spacer disposed over the first color filter, wherein the spacer includes a spacer pattern projected onto the second substrate, and the spacer pattern overlaps one of the two shielding pattern rows, and the one of the two shielding pattern rows includes an expansion portion, wherein the expansion portion has an edge and at least part of the edge is curved.

The present disclosure also provides a display device, including: a first substrate; a second substrate disposed opposite the first substrate; a shielding layer disposed over the second substrate, wherein the shielding layer includes two shielding pattern rows projected onto the second substrate; a first color filter disposed over the second substrate; a spacer disposed over the first color filter, wherein the spacer is a main spacer and includes a spacer pattern projected onto the second substrate, and the spacer pattern overlaps one of the two shielding pattern rows, and the one of the two shielding pattern rows includes an expansion portion, wherein the expansion portion has an edge and at least part of the edge is curved; and a sub-spacer is disposed over the second substrate.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIGS. 5A-5B are cross-sectional views or top views of a display panel in accordance with yet another embodiment of the present disclosure;

DETAILED DESCRIPTION

Figure 1A:
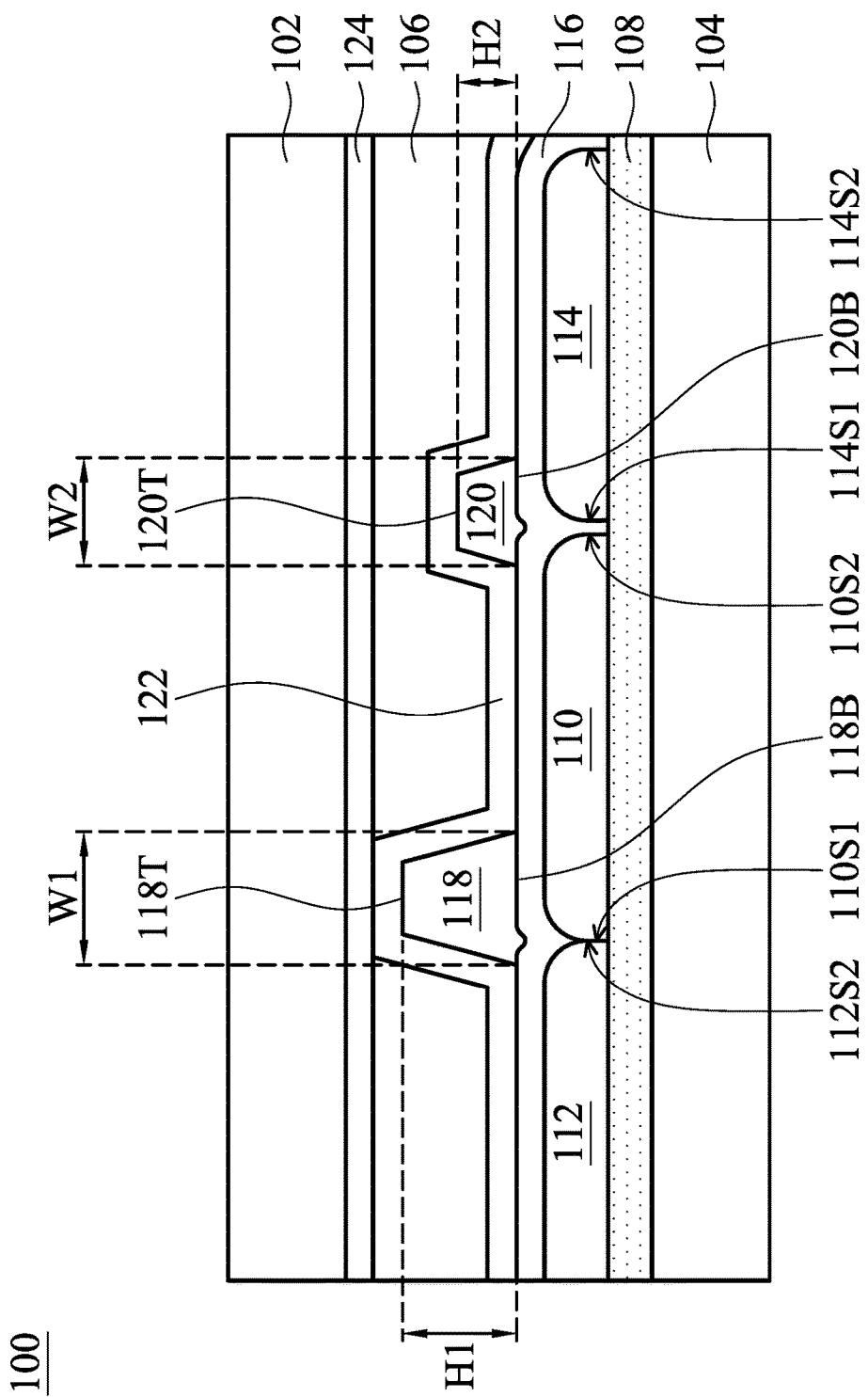
FIGS. 1A-1C are cross-sectional views or top views of a display panel in accordance with some embodiments of the present disclosure.

The display panel of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first insulating bump disposed on/over a second material layer", may indicate the direct contact of the first insulating bump and the second material layer, or it may indicate a non-contact state with one or more intermediate layers between the first insulating bump and the second material layer. In the above situation, the first insulating bump may not be in direct contact with the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

It should be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

The distance described in the present disclosure is measured by projecting all the elements in the top view onto a plane. This distance may be measured from the photograph taken by the optical microscope with 50× or 100× amplification factor.

The extension line described in the present disclosure is a virtual line extending along the side of the color filter on the aforementioned plane, wherein the side of the color filter is substantially parallel to the extension direction of the shielding pattern column which is disposed between two adjacent color filters. Substantially, the start point of the virtual line is the intersection point of the straight line and the curved line. The extension direction of the virtual line is substantially parallel to the extension direction of the straight line.

In the embodiments of the present disclosure, the side of the color filter deviates from the center of the spacer, which is disposed over this color filter, in order to lower the probability that this spacer is crooked and thus improve the yield.

First, FIG. 1A is a cross-sectional view of a display panel 100 in accordance with some embodiments of the present disclosure. As shown in FIG. 1A, the display panel 100 includes a first substrate 102, a second substrate 104 disposed opposite the first substrate 102, and a liquid-crystal layer 106 disposed between the first substrate 102 and the second substrate 104. The display panel 100 further includes a shielding layer 108 disposed over the second substrate 104 and a first color filter 110, a second color filter 112 and a third color filter 114 disposed over the shielding layer 108. The display panel 100 further includes a planarization layer 116 disposed over the second substrate 104 and first color filter 110, the second color filter 112 and the third color filter 114. The display panel 100 further includes a main spacer 118 and a sub-spacer 120 disposed over the planarization layer 116. The display panel 100 further includes a first alignment layer 122 which covers the main spacer 118, sub-spacer 120 and the planarization layer 116. The display panel 100 further includes a second alignment layer 124 disposed over the first substrate 102.

The display device 100 may include, but is not limited to, a liquid-crystal display such as a thin film transistor liquid-crystal display. Alternatively, the liquid-crystal display may include, but is not limited to, a twisted nematic (TN) liquid-crystal display, a super twisted nematic (STN) liquid-crystal display, a double layer super twisted nematic (DSTN) liquid-crystal display, a vertical alignment (VA) liquid-crystal display, a multi-domain vertical alignment (MVA) liquid-crystal display, an in-plane switching (IPS) liquid-crystal display, a fringe field switching (FFS) liquid-crystal display, a cholesteric liquid-crystal display, a blue phase liquid-crystal display, or any other suitable liquid-crystal display.

The first substrate 102 may include a transistor substrate. The first substrate 102 serving as a transistor substrate may include a transparent substrate. The transparent substrate may include, but is not limited to, a glass substrate, a ceramic substrate, a plastic substrate, or any other suitable transparent substrate. In addition, a transistor such as a thin film transistor (not shown) is disposed in or over the first substrate 102. This transistor is used to control the pixels.

Figure 1B:
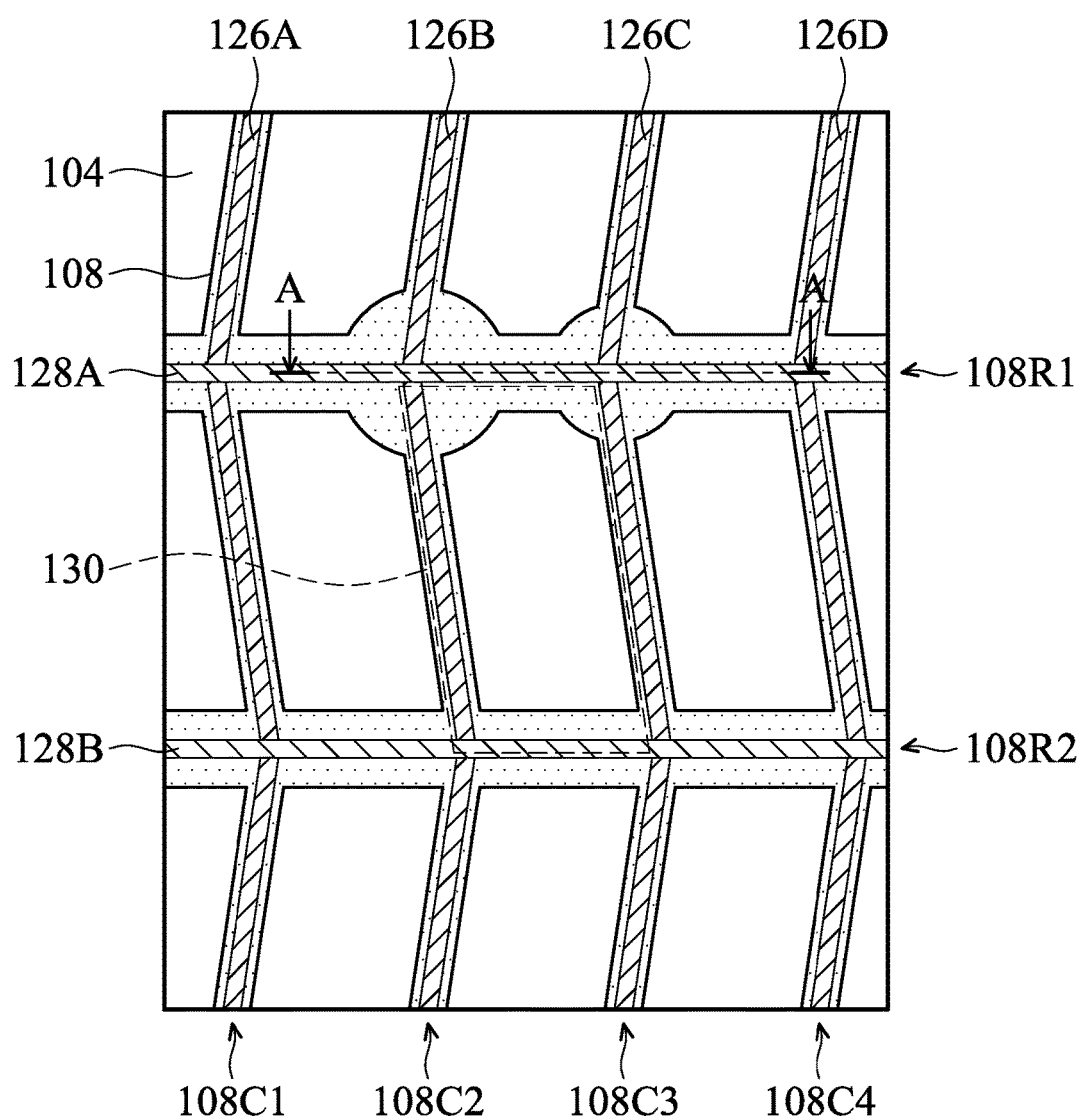

In addition, FIG. 1B is a top view of a display panel 100 in the embodiment shown in FIG. 1A. FIG. 1A is a cross-sectional view along line A-A in FIG. 1B in accordance with some embodiments of the present disclosure. As shown in FIG. 1B, the first substrate 102 includes two data lines (for example 126B and 126C) and two scan lines (for example 128A and 128B). The pair of data lines (for example 126B and 126C) and the pair of scan lines (for example 128A and 128B) together define a pixel region 130.

Referring back to FIG. 1A, the second substrate 104 may include a color filter substrate. The material of this color filter substrate may include, but is not limited to, a glass substrate, a ceramic substrate, a plastic substrate, or any other suitable transparent substrate.

It should be noted that, in order to clearly describe the display panel 100 of the present disclosure, FIG. 1B only shows the data lines 126 and scan lines 128 of the first substrate 102 and the shielding layer 108 disposed over the second substrate 104. The other elements of the display panel 100 are not shown in FIG. 1B.

liquid-crystal layer 106 may include, but is not limited to, nematic liquid-crystal, smectic liquid-crystal, cholesteric liquid-crystal, blue phase liquid-crystal, or any other suitable liquid-crystal material.

The shielding layer 108 is used to shield the elements or region which is not used to display colors in the display panel 100. For example, the shielding layer 108 may be used to shield the data lines and scan lines. The shielding layer 108 may include, but is not limited to, black photoresist, black printing ink, black resin or any other suitable light-shielding materials of various colors.

In particular, referring to FIG. 1B, the shielding layer 108 of the display panel 100 includes two shielding pattern rows (for example 108R1 and 108R2) projected onto the second substrate 104 and two shielding pattern columns (for example 108C2 and 108C3) projected onto the second substrate 104. The two shielding pattern rows shield the two scan lines (for example 128A and 128B). The two shielding pattern columns (for example 108C2 and 108C3) shield the data lines (for example 126B and 126C). In particular, four shielding pattern columns 108C1, 108C2, 108C3 and 108C4 shown in FIG. 1B shield four data lines 126A, 126B, 126C and 126D, respectively. The shielding pattern rows 108R1 and 108R2 shield the scan lines 128. In particular, the shielding pattern row 108R1 shields the scan line 128A, and the shielding pattern row 108R2 shields the scan line 128B.

Referring back to FIG. 1A, the first color filter 110, the second color filter 112 and the third color filter 114 may independently include, but are not limited to, red filter, green filter, blue filter, or any other suitable color filter. For example, in one embodiment, the first color filter 110 is a red filter, the second color filter 112 is a blue filter, and the third color filter 114 is a green filter.

Figure 1C:
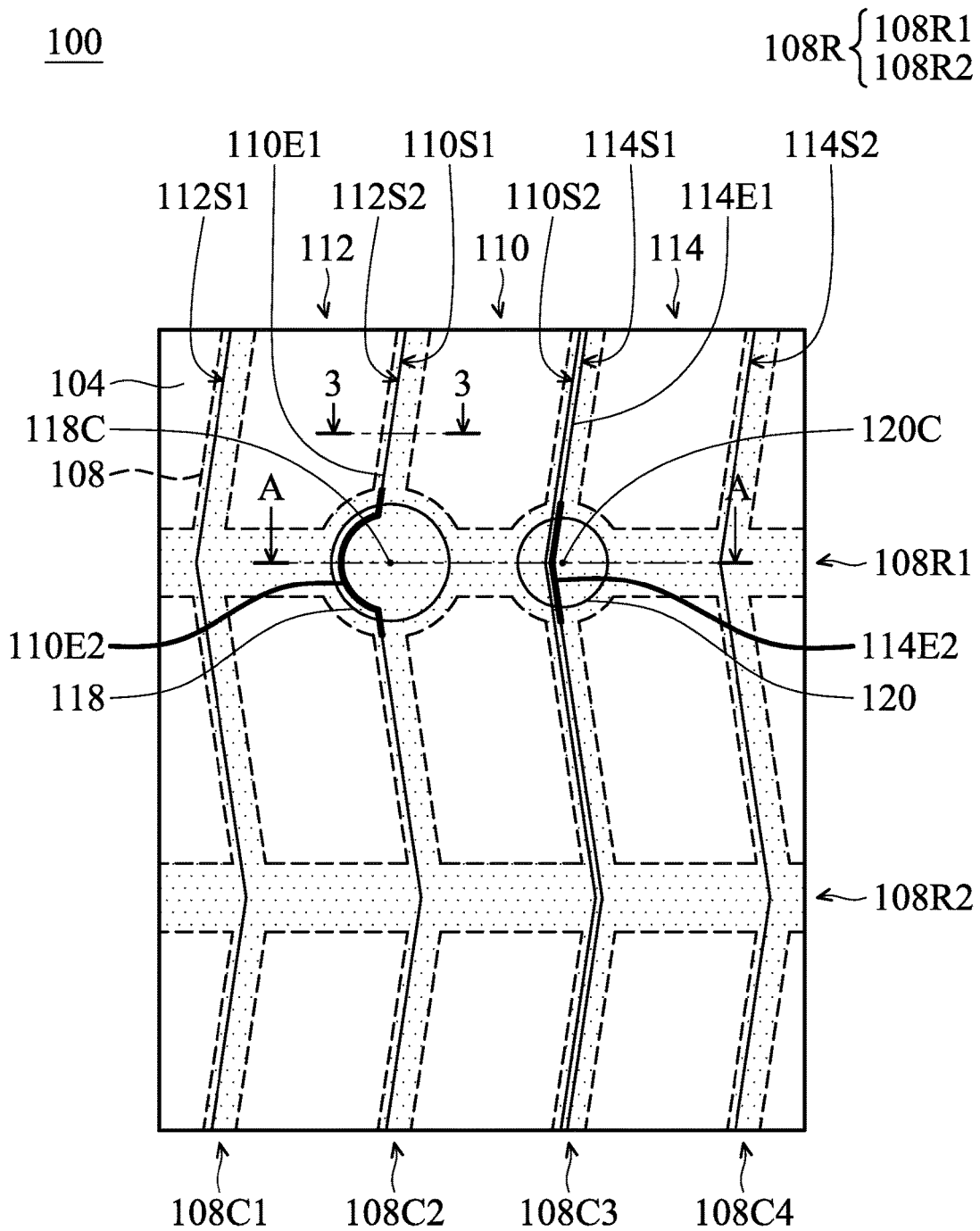

FIG. 1C is a top view of a display panel 100 in the embodiment shown in FIG. 1A. FIG. 1A is a cross-sectional view along line A-A in FIG. 1C in accordance with some embodiments of the present disclosure. In order to clearly describe the present disclosure, FIG. 1C does not show the data lines and scan lines. As shown in FIG. 1C, the second color filter 112 and the third color filter 114 are disposed at opposite sides of the first color filter 110, respectively. In addition, since the shielding layer 108 is disposed under the first color filter 110, the second color filter 112 and the third color filter 114, the shielding layer 108 is represented by dash lines.

In addition, as shown in FIG. 1C, the first color filter 110 has opposite sides 110S1 and 110S2, the second color filter 112 has opposite sides 112S1 and 112S2, and the third color filter 114 has opposite sides 114S1 and 114S2. In addition, the side 112S2 of the second color filter 112 is adjacent to the side 110S1 of the first color filter 110. The side 110S2 of the first color filter 110 is adjacent to the side 114S1 of the third color filter 114.

It should be noted that FIG. 1B and FIG. 1C show the same display panel in the same embodiment. In order to clearly describe the present disclosure, FIG. 1C does not show the data lines and scan lines.

Referring back to FIG. 1A, in one embodiment, the planarization layer 116 may be conformally disposed over the first color filter 110. The planarization layer 116 may include, but is not limited to, plastic or photoresist. For example, the planarization layer 116 may include, but is not limited to, acrylate material, epoxy acrylate material, siloxane material, or any other suitable material, or a combination thereof.

As shown in FIG. 1A, the spacer (for example, the main spacer 118 or the sub-spacer 120) is disposed over the planarization layer 116. The main spacer 118 disposed over the planarization layer 116 (or the second substrate 104) is used to space the first substrate 102 apart from the second substrate 104. Therefore, the liquid-crystal layer 106 may be disposed between the first substrate 102 and second substrate 104. The sub-spacer 120 is the structure used to prevent the first substrate 102 from touching the second substrate 104 when the display device 100 is pressed or touched.

In addition, since the main spacer 118 is the main structure used to space the first substrate 102 apart from the second substrate 104, whereas the sub-spacer 120 is the structure used to prevent the first substrate 102 from touching the second substrate 104 when the display device 100 is pressed or touched, the height of the main spacer 118 is higher than the height of the sub-spacer 120, and the width of the main spacer 118 is wider than the width of the sub-spacer 120. In particular, the main spacer 118 has a first height H1, and the sub-spacer 120 has a second height H2. The first height H1 is greater than the second height H2. In addition, the main spacer 118 has a first width W1, and the sub-spacer 120 has a second width W2. The first width W1 is greater than the second width W2.

In addition, the main spacer 118 has a top surface 118T far from the second substrate 104 and a bottom surface 118B adjacent to the second substrate 104. The sub-spacer 120 also has a top surface 120T far from the second substrate 104 and a bottom surface 120B adjacent to the second substrate 104. The material of the main spacer 118 and sub-spacer 120 may independently include, but is not limited to, a resist such as a positive resist or a negative resist. The main spacer 118 and the sub-spacer 120 may be formed by the same photolithography and/or etching steps. However, the main spacer 118 and the sub-spacer 120 may be formed by different photolithography and/or etching steps. In one embodiment, the photolithography steps may include resist patterning. The resist patterning may include steps such as resist coating, soft baking, mask alignment, pattern exposure, post-exposure baking, resist developing and hard baking.

Referring to FIG. 1A, the first alignment layer 122 and second alignment layer 124 are layers used to induce the liquid-crystal molecules to align in a specific direction. The materials of each of the first alignment layer 122 and second alignment layer 124 may independently include, but are not limited to, polyimide, or any other suitable alignment material. The first alignment layer 122 is disposed over the second substrate 104, the planarization layer 116, the main spacer 118 and the sub-spacer 120. In addition, the first alignment layer 122 disposed over the top surface 118T of the main spacer 118 may directly contact the second alignment layer 124.

Referring to FIGS. 1A and 1C, the main spacer 118 is disposed between the first color filter 110 and the second color filter 112. In addition, the main spacer 118 includes a spacer pattern projected onto the second substrate 104, and the spacer pattern overlaps one of the two shielding pattern rows 108R. It should be noted that FIG. 1C shows the projected profile of the spacer pattern of the bottom surface 118B of the main spacer 118 on the second substrate 104 and the projected profile of the spacer pattern of the bottom surface 120B of the sub-spacer 120 on the second substrate 104 in FIG. 1A. In this embodiment, most of the spacer pattern of the bottom surface 118B of the main spacer 118 is disposed over the first color filter 110, and a small part of the spacer pattern of the bottom surface 118B of the main spacer 118 is disposed over the second color filter 112.

In the embodiment shown in FIG. 1C, the spacer pattern of the main spacer 118 is disposed over the shielding pattern row 108R1. This shielding pattern row 108R1 includes an expansion portion, which corresponds to the spacer pattern of the main spacer 118. In addition, the shielding pattern row 108R1 completely covers the spacer pattern of the main spacer 118. In particular, the edge of the shielding pattern row 108R1 corresponding to the spacer pattern of the main spacer 118 has an arc shape. This arc shape defines the expansion portion of the shielding pattern row 108R1. The spacer pattern of the bottom surface 118B of the main spacer 118 is completely disposed inside the region corresponding to the expansion portion of the shielding pattern row 108R1.

Therefore, the shielding pattern row 108R2 without a main spacer 118 or a sub-spacer 120 formed thereon includes only a straight portion, whereas the shielding pattern row 108R1 with the main spacer 118 and/or the sub-spacer 120 formed thereon includes a straight portion and an expansion portion.

Still referring to FIG. 1C, the first color filter 110 has a first side 110S1 projected onto the second substrate 104. The first side 110S1 includes a first portion 110E1 located between the two shielding pattern rows and a second portion 110E2 overlapped with the shielding pattern rows 108R1. In other words, the second portion 110E2 overlaps with one of the two shielding pattern rows 108R1 and 108R2. The first portion 110E1 connects to the second portion 110E2.

In other words, the first portion 110E1 and the second portion 110E2 are different portions of the same side. In particular, the first portion 110E1 and the second portion 110E2 are different portions of the first side 110S1 of the first color filter 110. The portion of the first side 110S1 overlapped with the shielding pattern row 108R1 which has the main spacer 118 and/or the sub-spacer 120 formed thereon is the second portion 110E2. The other portion of the first side 110S1 is the first portion 110E1. In addition, the first portion 110E1 may be overlapped with one of the shielding pattern columns 108C2 and 108C3. For example, in one embodiment, the first portion 110E1 overlaps with the shielding pattern columns 108C2.

Figure 2:
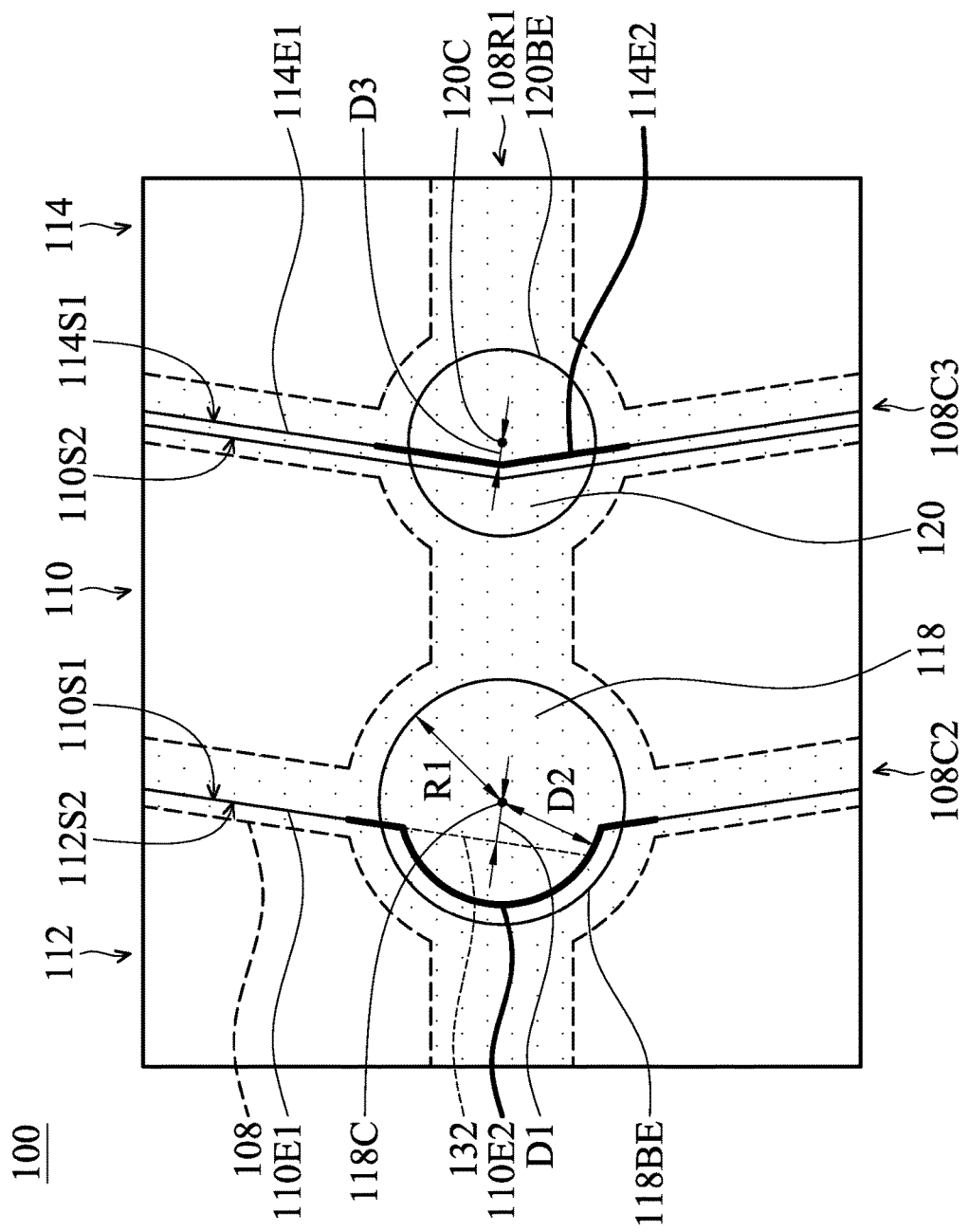
FIG. 2 is a partially enlarged figure of FIG. 1C.

FIG. 2 is a partially enlarged figure of FIG. 1C. As shown in FIG. 2, the shortest distance between the extension line 132 of the first portion 110E1 of the first color filter 110 and the center 118C of the spacer pattern of the main spacer 118 is the distance D1, and the shortest distance between the second portion 110E2 and the center 118C of the spacer pattern of the main spacer 118 is the distance D2. The distance D1 is shorter than the distance D2. The extension direction of the extension line 132 is the main extension direction of the first portion.

By having the distance D1 be shorter than the distance D2, the yield of the display panel may be improved. In particular, while the display device is developed to be thinner, lighter, smaller and more fashionable, the thickness of the planarization layer conformally or blanketly disposed over the color filter may be decreased. Therefore, recesses in the planarization layer at the edge of the color filter may result. For example, in FIG. 1A, the result is recesses forming in the planarization layer 116 at the sides 110S1 and 110S2 of the first color filter 110. If these recesses are disposed under the center of the main spacer, the flatness of the top surface of the main spacer may be affected and the top surfaces of some main spacer may be crooked. Therefore, the distance between the first substrate and the second substrate may not be kept constant. In some embodiments, the result is bubbles forming between the first substrate and the second substrate, which lowers the yield.

Therefore, in the embodiments of the present disclosure, the side of the color filter deviates from the center of the spacer which is disposed over this color filter. Therefore, the recesses of the planarization layer also deviate from the center of the spacer, and the probability that this spacer is crooked is lowered. Therefore, the distance between the first substrate and the second substrate may be kept constant and the yield of the display panel may be improved.

In some embodiments, as shown in FIG. 2, the distance D2 may be about 1.5 to 3.5 times the distance D1 (D2=1.5× D1~3.5×D1), for example about 2 to 3 times the distance D1 (D2=2×D1~3×D1). Alternatively, the distance D2 may be about 0.5 to 1.5 times the radius R1 of the spacer pattern of the main spacer 118 (D2=0.5×R1~1.5×R1), for example about 0.7 to 1.2 times the radius R1 of the spacer pattern of the main spacer 118 (D2=0.7×R1~1.2×R1), or about 1 time the radius R1 of the spacer pattern of the main spacer 118 (D2=R1).

When the distance D2 is 1 time the radius R1 of the spacer pattern of the main spacer 118 (D2=R1), the second portion 110E2 of the first color filter 110 overlaps with the edge 118BE of the spacer pattern of the bottom surface 118B of the main spacer 118.

In addition, in one embodiment, as shown in FIG. 2, a portion of the first portion 110E1 is a straight line extending along one of the pair of the data lines 126 (for example, the data line 126B in FIG. 1B). The second portion 110E2 is a curved line curved along an edge 118BE of a bottom of the spacer pattern of the main spacer 118.

In one embodiment, the curvature of the curve portion of the second portion 110E2 is substantially the same as the curvature of the edge 118BE of the spacer pattern of the bottom of the main spacer 118. In other embodiments, the curvature of the curve portion of the second portion 110E2 may be about 1.2 to about 0.8 times the curvature of the edge 118BE of the spacer pattern of the bottom of the main spacer 118, for example, about 1.1 to about 0.9 times the curvature of the edge 118BE of the spacer pattern of the bottom of the main spacer 118.

Referring to FIGS. 1A and 1C, the sub-spacer 120 is disposed between the first color filter 110 and the third color filter 114. The spacer pattern of the sub-spacer 120 is disposed over one of the two shielding pattern rows (108R1 and 108R2). For example, the spacer pattern of the sub-spacer 120 is disposed over the shielding pattern row 108R1. The third color filter 114 has a second side 114S1. The second side 114S1 includes a third portion 114E1 disposed between the two shielding pattern rows (108R1 and 108R2) and a fourth portion 114E2 disposed over one of the two shielding pattern rows (108R1 and 108R2). The third portion 114E1 connects to the fourth portion 114E2. The portion of the second side 114S1 disposed between the two adjacent shielding pattern rows and the portion of the second side 114S1 overlapped with the shielding pattern row 108R2 which has no main spacer 118 or the sub-spacer 120 formed thereon are collectively referred to as the third portion 114E1. The portion of the second side 114S1 overlapped with the shielding pattern row 108R which has the main spacer 118 and/or the sub-spacer 120 formed thereon is referred to as the fourth portion 114E2. The third portion 114E1 connects to the fourth portion 114E2. In addition, the third portion 114E1 and the fourth portion 114E2 are both straight lines.

Referring to FIG. 2, in this embodiment, the extension line of the third portion 114E1 of the third color filter 114 is partially overlapped with the fourth portion 114E2. Therefore, the shortest distance between the extension line of the third portion 114E1 and the center 120C of the spacer pattern of the sub-spacer 120 is the same as the shortest distance between the fourth portion 114E2 and the center 120C of the spacer pattern of the sub-spacer 120. These shortest distance are both distance D3.

In addition, in this embodiment, as shown in FIGS. 1A and 1C, the first color filter 110 overlaps with the second color filter 112, whereas the first color filter 110 is not overlapped with the third color filter 114. In particular, when viewed from a top view as FIG. 1C, the second color filter 112 and the first color filter 110 have sides 112S2 and 110S1 adjacent to each other. When viewed from a cross-sectional view as FIG. 1A, the side 112S2 is the sidewall of the second color filter 112, and the side 110S1 is the sidewall of the first color filter 110. The two sidewalls are in direct contact with each other at a boundary. Similarly, when viewed from a top view as FIG. 1C, the third color filter 114 and the first color filter 110 have sides 114S1 and 110S2 that are adjacent to each other. When viewed from a cross-sectional view as FIG. 1A, the side 114S1 is the sidewall of the third color filter 114, and the side 110S2 is the sidewall of the first color filter 110. The two sidewalls do not come into direct contact with each other. The two sidewalls are spaced apart by the planarization layer 116.

It should be noted that the first color filter 110, the second color filter 112 and the third color filter 114 may have other configurations. This will be described in detail in the following description. The exemplary embodiments set forth in FIGS. 1A-2 is merely for the purpose of illustration, the inventive concept may be embodied in various forms without being limited to the exemplary embodiments.

In one embodiment, the first color filter 110 is a red filter, the second color filter 112 is a blue filter, and the third color filter 114 is a green filter. In other words, in this embodiment, the main spacer 118 is disposed between the red filter and the blue filter, rather than between the green filter and other color filters. Since the area of the shielding layer 108 corresponding to the spacer pattern of the main spacer 118 is larger, it shield more light. In addition, green light has the strongest brightness in red, blue and green lights. Therefore, not disposing the main spacer 118 between the green filter and other color filters may prevent the shielding layer 108, which corresponds to the spacer pattern of the main spacer 118 and has the larger area, from shielding the green light with the stronger brightness. Therefore, the brightness of the display panel may be improved.

Figure 3:
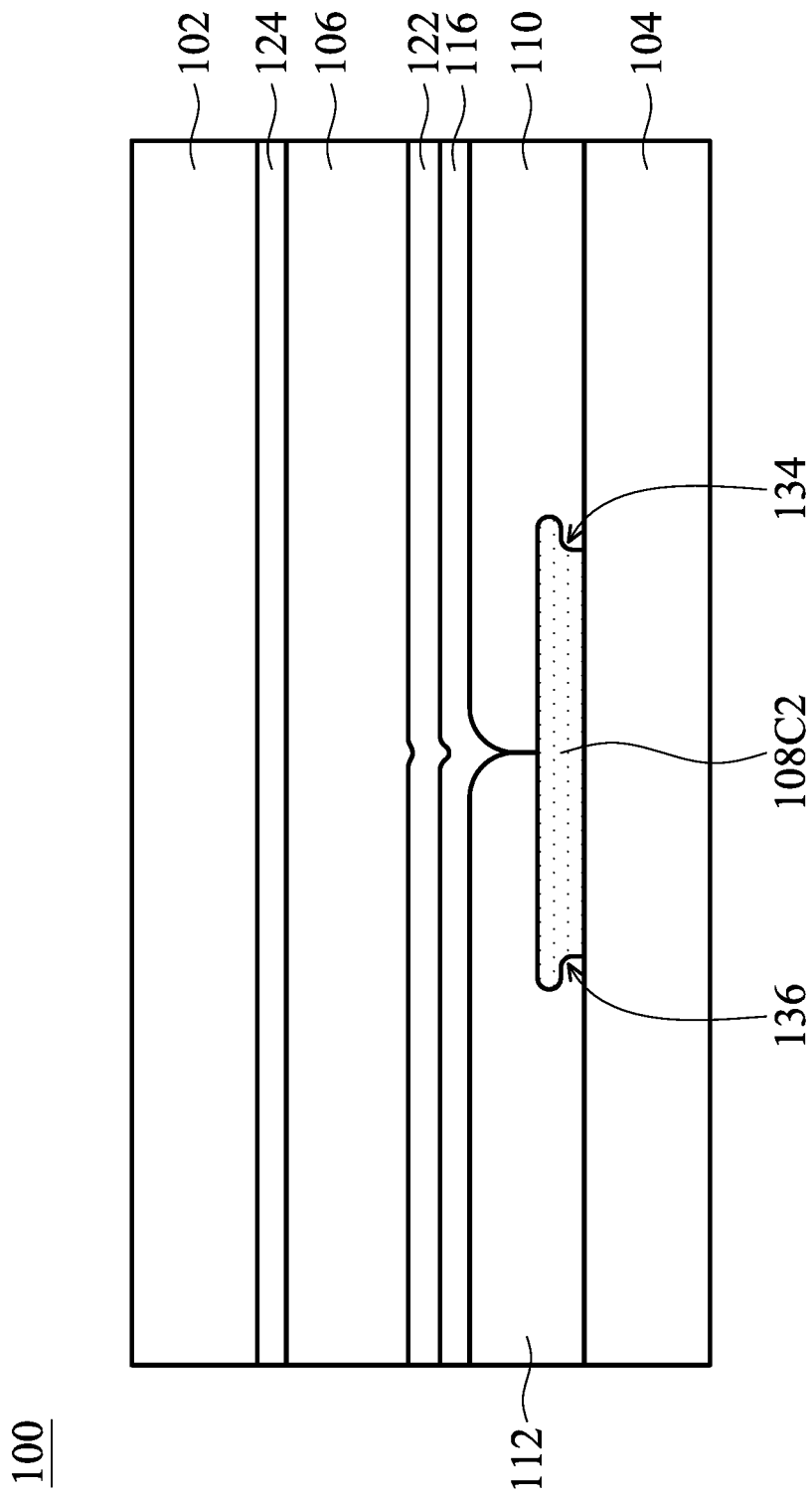
FIG. 3 is a cross-sectional view along line 3-3 in FIG. 1C in accordance with some embodiments of the present disclosure.

FIG. 3 is a cross-sectional view along line 3-3 in FIG. 1C in accordance with some embodiments of the present disclosure. In the embodiment shown in FIG. 3, the display panel 100 includes undercut regions 134 and 136 between the second substrate 104 and the shielding layer 108 (for example, the shielding pattern column 108C2), and portions of the first color filter 110 and second color filter 112 are filled into the undercut regions 134 and 136. In addition, a portion of the third color filter (not shown in FIG. 3) may also be filled into other undercut regions between the second substrate and the shielding layer.

Figure 4A:
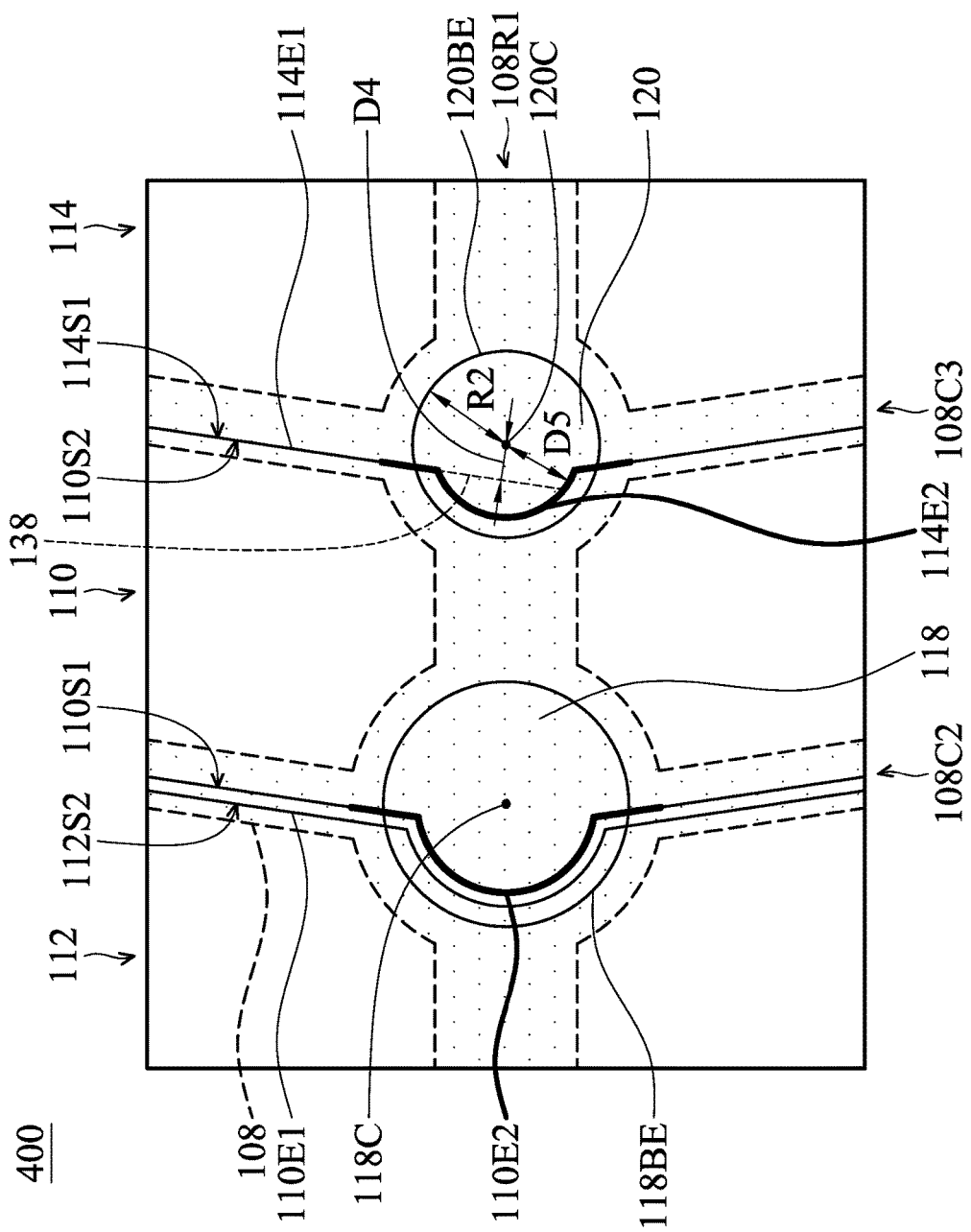
FIGS. 4A-4B are cross-sectional views or top views of a display panel in accordance with another embodiment of the present disclosure.
Figure 4B:
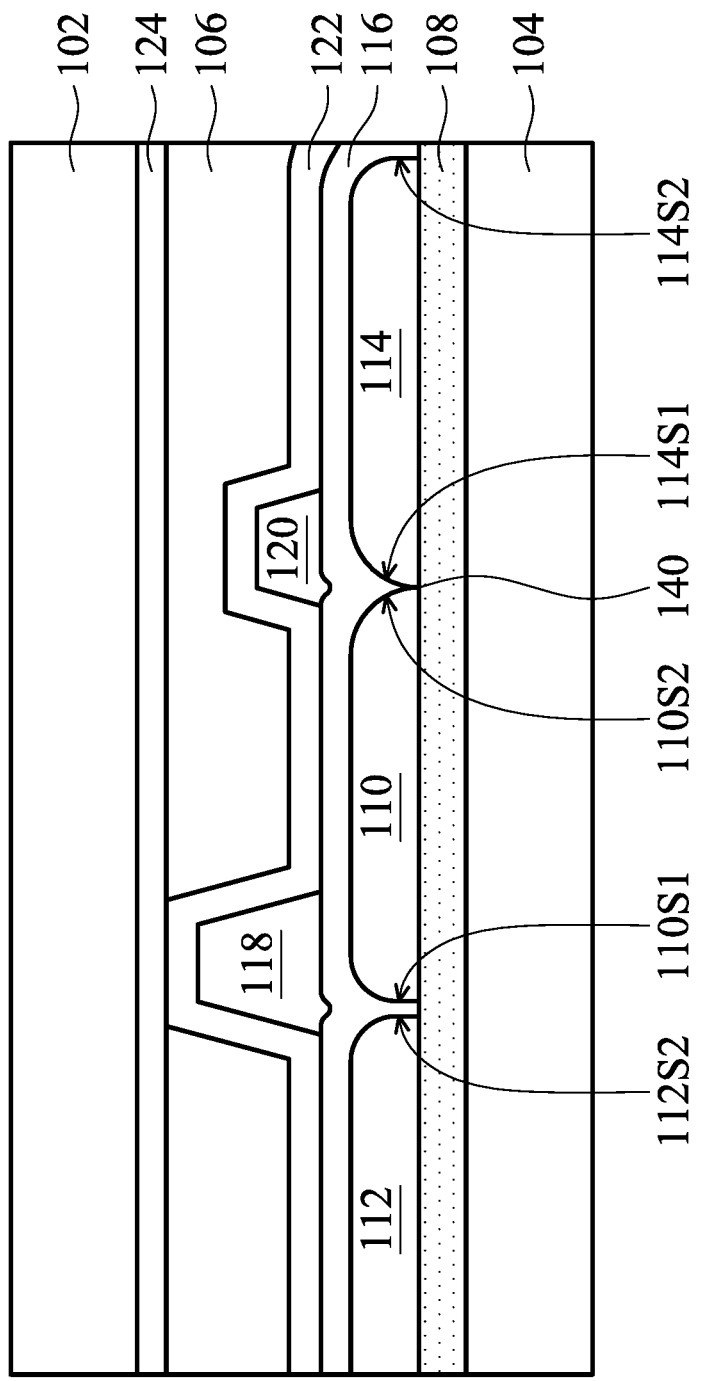

FIGS. 4A-4B are cross-sectional views or top views of a display panel 400 in accordance with another embodiment of the present disclosure. Note that the same or similar elements or layers corresponding to those of the semiconductor device are denoted by like reference numerals. The same or similar elements or layers denoted by like reference numerals have the same meaning and will not be repeated for the sake of brevity. The difference between the embodiment shown in FIGS. 4A-4B and the embodiment shown in FIG. 2 is that the shortest distance between the extension line of the third portion of the third color filter and the center of the sub-spacer is shorter than the shortest distance between the fourth portion and the center of the sub-spacer.

As shown in FIG. 4A, the shortest distance between the extension line 138 of the third portion 114E1 of the third color filter 144 and the center 120C of the spacer pattern of the sub-spacer 120 is a distance D4, and the shortest distance between the fourth portion 114E2 and the center 120C of the spacer pattern of the sub-spacer 120 is a distance D5. The distance D4 is shorter than the distance D5. The extension direction of the extension line 138 is the main extension direction of the third portion.

By having the distance D4 be shorter than the distance D5, the yield of the display panel may be improved. In particular, while the display device has been developed to be thinner, lighter, smaller and more fashionable, the thickness of the planarization layer conformally or blanketly disposed over the color filter may be decreased. Therefore, recesses may result in the planarization layer at the edge of the color filter. For example, in FIG. 1A, recesses form in the planarization layer 116 at the side 110S2 of the first color filter 110 and side 114S1 of the third color filter 114. If these recesses are disposed under the center of the sub-spacer, the flatness of the top surface of the sub-spacer may be affected and the top surfaces of some sub-spacers may be crooked, which lowers the yield.

Therefore, in the embodiments of the present disclosure, the side of the color filter deviates from the center of the sub-spacer which is disposed over this color filter. Therefore, the recesses of the planarization layer also deviate from the center of the sub-spacer which is disposed over these recesses, and the probability that this sub-spacer is crooked is lowered. Therefore, the yield of the display panel may be improved.

In some embodiments, as shown in FIG. 4A, the distance D5 may be about 1.5 to 3.5 times the distance D4 (D5=1.5× D4~3.5×D4), for example about 2 to 3 times the distance D4 (D5=2×D4~3×D4). Alternatively, the distance D5 may be about 0.5 to 1.5 times the radius R2 of the spacer pattern of the sub-spacer 120 (D5=0.5×R2~1.5×R2), for example about 0.7 to 1.2 times the radius R2 of the spacer pattern of the sub-spacer 120 (D5=0.7×R2~1.2×R2), or about 1 time the radius R2 of the spacer pattern of the sub-spacer 120 (D5=R2).

When the distance D5 is 1 time the radius R2 of the spacer pattern of the sub-spacer 120 (D5=R2), the fourth portion 114E2 of the third color filter 114 overlaps with the edge 120BE of the spacer pattern of the bottom surface 120B of the sub-spacer 120.

In addition, in one embodiment, as shown in FIG. 4A, a portion of the third portion 114E1 is a straight line extending along one of the pair of the data lines (for example, the data line 126C). The fourth portion 114E2 is a curved line curved along an edge 120BE of the spacer pattern of the bottom of the sub-spacer 120.

In addition, in this embodiment, as shown in FIG. 4B, the first color filter 110 is not overlapped with the second color filter 112, whereas the first color filter 110 intersects the third color filter 114 at a point 140. In particular, when viewed from a top view, the second color filter 112 and the first color filter 110 have sides 112S2 and 110S1 adjacent to each other. These two sides 112S2 and 110S1 do not come in contact with each other. The two sidewalls 112S2 and 110S1 are spaced apart by the planarization layer 116. In addition, the third color filter 114 and the first color filter 110 have sides 114S1 and 110S2 adjacent to each other. These two sides 114S1 and 110S2 come into direct contact with each other at the point 140.

It should be noted that the first color filter, the second color filter and the third color filter may have other configurations. Those skilled in the art will appreciate that the first color filter may be overlapped with the second color filter, or the first color filter may intersect the second color filter at one point, or the first color filter may be not overlapped with the second color filter. Similarly, the first color filter may be overlapped with the third color filter, or the first color filter may intersect the third color filter at one point, or the first color filter may be not overlapped with the third color filter.

Figure 5B:
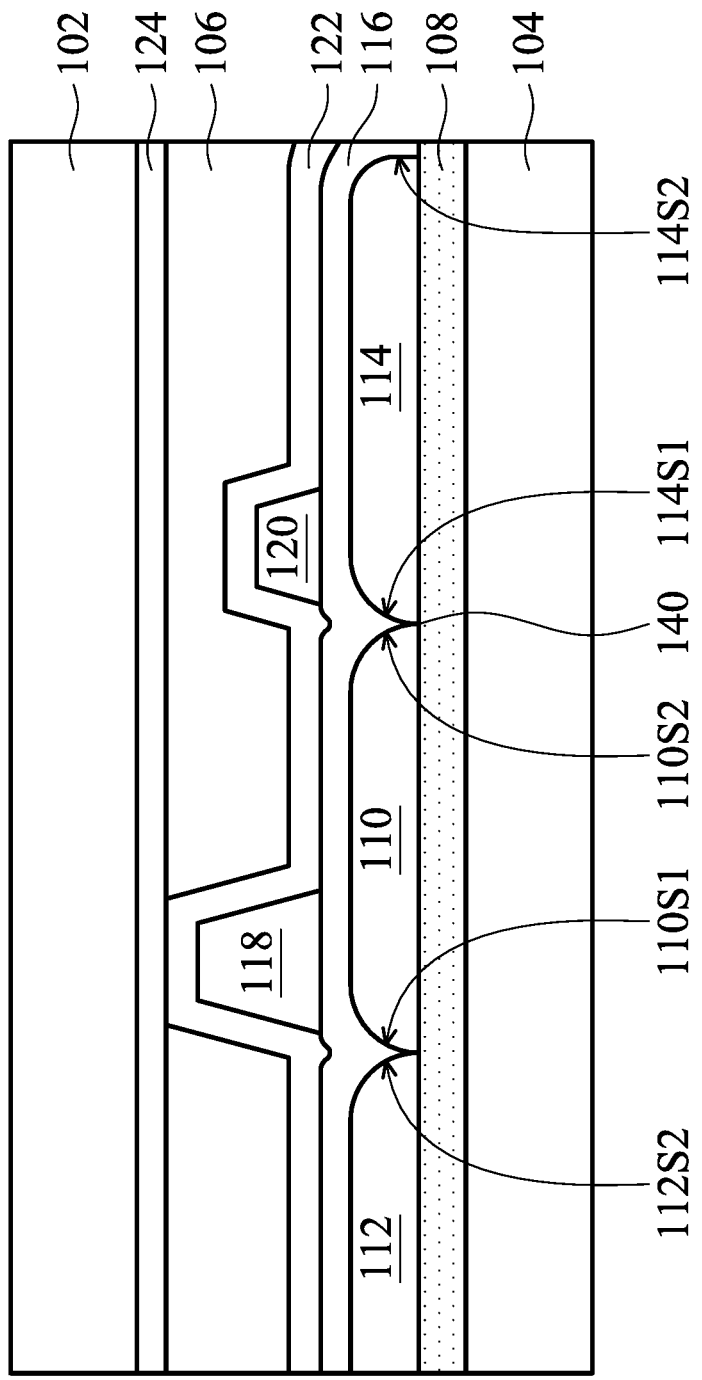

FIGS. 5A-5B are cross-sectional views or top views of a display panel 500 in accordance with yet another embodiment of the present disclosure. Note that the same or similar elements or layers corresponding to those of the semiconductor device are denoted by like reference numerals. The same or similar elements or layers denoted by like reference numerals have the same meaning and will not be repeated for the sake of brevity. The difference between the embodiment shown in FIGS. 5A-5B and the embodiment shown in FIGS. 4A-4B is that the second portion of the first color filter is disposed outside the region corresponding to the main spacer, rather than inside the region corresponding to the main spacer. In addition, the fourth portion of the third color filter is disposed outside the region corresponding to the sub-spacer, rather than inside the region corresponding to the sub-spacer.

In particular, in this embodiment, as shown in FIGS. 5A-5B, the first color filter 110 overlaps with the second color filter 112, and the first color filter 110 also overlaps with the third color filter 114. In addition, when viewed from a top view of this display panel 500, the second portion 110E2 of the first color filter 110 is disposed outside the region corresponding to the spacer pattern of the main spacer 118, rather than inside the region corresponding to the spacer pattern of the main spacer 118. In addition, when viewed from a top view of this display panel 500, the fourth portion 114E2 of the third color filter 114 is disposed outside the region corresponding to the spacer pattern of the sub-spacer 120, rather than inside the region corresponding to the spacer pattern of the sub-spacer 120. In addition, the second portion 110E2 of the first color filter 110 and the fourth portion 114E2 of the third color filter 114 are both disposed over the shielding layer 108. In other words, the second portion 110E2 of the first color filter 110 and the fourth portion 114E2 of the third color filter 114 are both disposed inside the region corresponding to the shielding layer 108.

Figure 6:
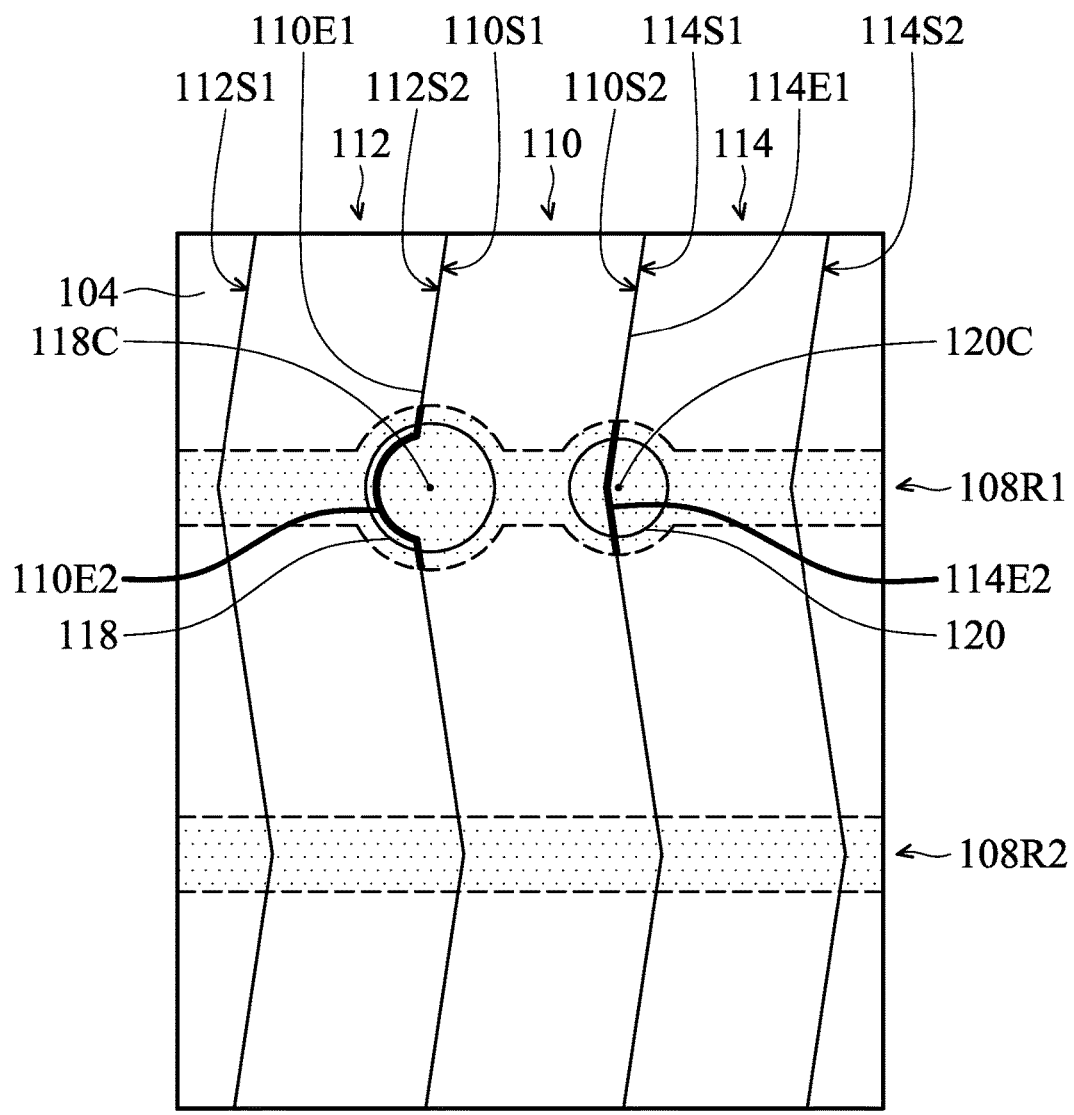
FIG. 6 is a top view of a display panel in accordance with a further embodiment of the present disclosure.

FIG. 6 is a top view of a display panel 600 in accordance with a further embodiment of the present disclosure. Note that the same or similar elements or layers corresponding to those of the semiconductor device are denoted by like reference numerals. The same or similar elements or layers denoted by like reference numerals have the same meaning and will not be repeated for the sake of brevity. The difference between the embodiment shown in FIG. 6 and the embodiment shown in FIGS. 1A-5B is that the shielding layer 108 only includes the shielding pattern rows and does not include the shielding pattern column.

In particular, in the embodiment shown in FIG. 6, the shielding layer 108 only includes two shielding pattern rows 108R1 and 108R2 which shield the two scan lines, and the shielding layer 108 does not include the shielding pattern column which shield the data lines.

Figure 7:
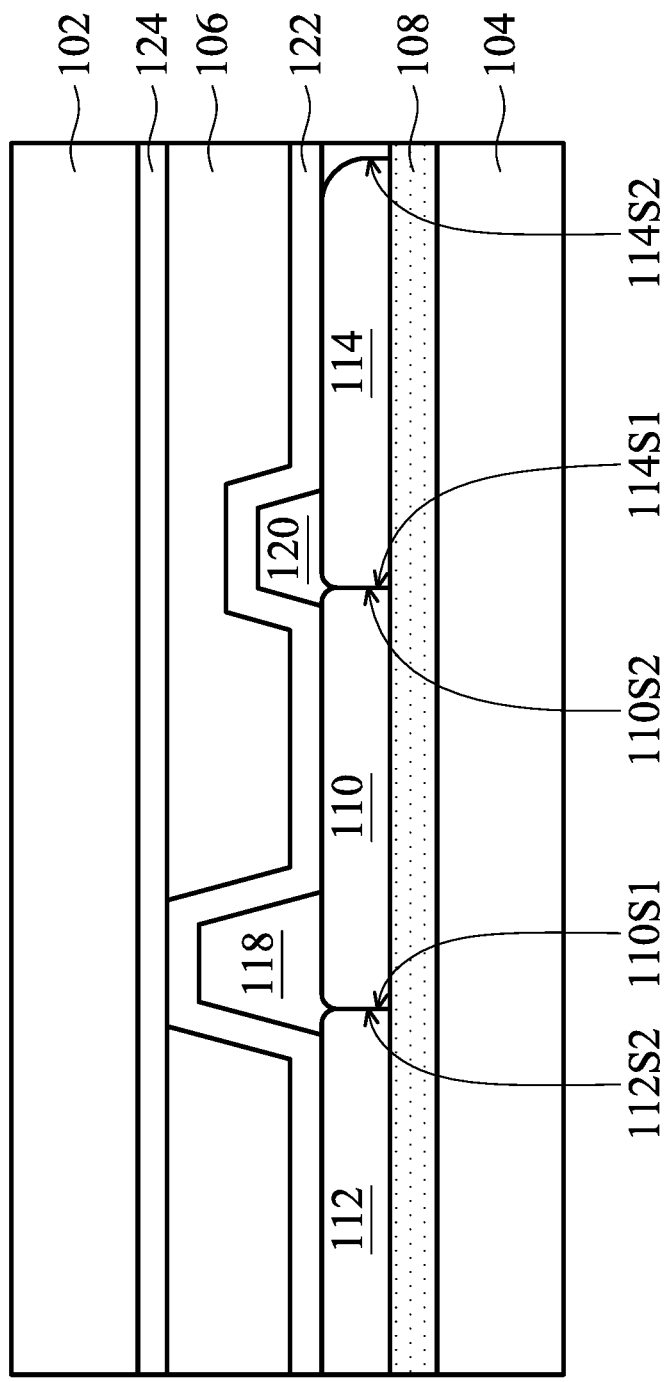
FIG. 7 is a cross-sectional view of a display panel in accordance with another embodiment of the present disclosure.

FIG. 7 is a cross-sectional view of a display panel 700 in accordance with another embodiment of the present disclosure. Note that the same or similar elements or layers corresponding to those of the semiconductor device are denoted by like reference numerals. The same or similar elements or layers denoted by like reference numerals have the same meaning and will not be repeated for the sake of brevity. The difference between the embodiment shown in FIG. 7 and the embodiment shown in FIGS. 1A-6B is that the display panel does not include a planarization layer disposed over the color filter.

In particular, in the embodiment shown in FIG. 7, the display panel 700 does not include a planarization layer disposed over the first color filter 110, the second color filter 112 and the third color filter 114. The main spacer 118 is in direct contact with the first color filter 110 and the second color filter 112. The sub-spacer 120 is in direct contact with the third color filter 114 and the first color filter 110.

Figure 8:
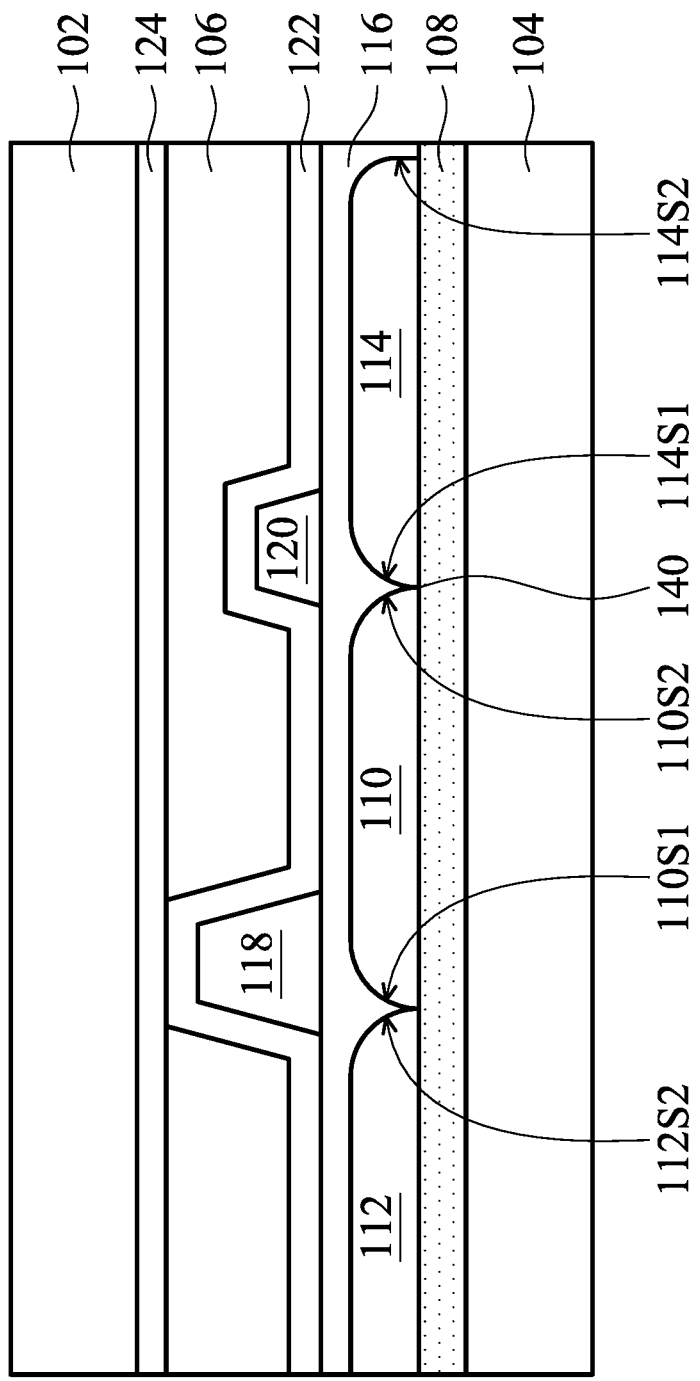
FIG. 8 is a cross-sectional view of a display panel in accordance with yet another embodiment of the present disclosure.

FIG. 8 is a cross-sectional view of a display panel 800 in accordance with yet another embodiment of the present disclosure. Note that the same or similar elements or layers corresponding to those of the semiconductor device are denoted by like reference numerals. The same or similar elements or layers denoted by like reference numerals have the same meaning and will not be repeated for the sake of brevity. The difference between the embodiment shown in FIG. 8 and the embodiment shown in FIGS. 1A-7B is that the planarization layer is blanketly disposed over the color filter, rather than conformally disposed over the color filter.

In particular, in the embodiment shown in FIG. 8, the planarization layer 116 is blanketly disposed over the first color filter 110, the second color filter 112 and the third color filter 114. It should be noted that, although the planarization layer 116 is blanketly disposed over the color filter in this embodiment, recesses may still result, in the planarization layer at the edge of the color filter. Therefore, by applying the present disclosure to the display panel including a planarization layer which is blanketly deposited, the yield of the display panel may still be improved.

In summary, in the embodiments of the present disclosure, the side of the color filter deviates from the center of the spacer which is disposed over this color filter, and thus the recesses of the planarization layer also deviate from the center of the spacer which is disposed over these recesses. Therefore, the yield of the display panel may still be improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display panel, comprising:
   a first substrate;
   a second substrate disposed opposite the first substrate;
   a shielding layer disposed over the second substrate, wherein the shielding layer comprises two shielding pattern rows projected onto the second substrate;
   a first color filter disposed over the second substrate and the shielding layer; and
   a spacer disposed over the first color filter, wherein the spacer comprises a spacer pattern projected onto the second substrate, and the spacer pattern overlaps one of the two shielding pattern rows, and the one of the two shielding pattern rows comprises an expansion portion, wherein the expansion portion has an edge and at least part of the edge is curved.

2. The display panel as claimed in claim 1, further comprising:
   a second color filter and a third color filter disposed at opposite sides of the first color filter respectively, wherein the first color filter overlaps the second color filter, whereas the first color filter does not overlap the third color filter.

3. The display panel as claimed in claim 2, wherein the spacer is a main spacer and the display panel further comprises a sub-spacer overlapping the third color filter.

4. The display panel as claimed in claim 3, wherein the sub-spacer overlaps the one of the two shielding pattern rows.

5. The display panel as claimed in claim 1, further comprising:
   a planarization layer disposed over the first color filter, wherein the spacer is disposed over the planarization layer.

6. The display panel as claimed in claim 1, wherein the first substrate comprises a data line disposed over the second substrate.

7. The display panel as claimed in claim 6, wherein the first color filter extends along the data line.

8. The display panel as claimed in claim 1, wherein a portion of a side of the first color filter is curved.

9. The display panel as claimed in claim 1, wherein the spacer is a main spacer, and the display panel further comprises:
   a sub-spacer disposed between the first color filter and the third color filter, wherein the main spacer has a first height, and the sub-spacer has a second height, wherein the first height is greater than the second height.

10. A display device, comprising:
    a first substrate;
    a second substrate disposed opposite the first substrate;
    a shielding layer disposed over the second substrate, wherein the shielding layer comprises two shielding pattern rows projected onto the second substrate;
    a first color filter disposed over the second substrate;
    a spacer disposed over the first color filter, wherein the spacer is a main spacer and comprises a spacer pattern projected onto the second substrate, and the spacer pattern overlaps one of the two shielding pattern rows, and the one of the two shielding pattern rows comprises an expansion portion, wherein the expansion portion has an edge and at least part of the edge is curved; and
    a sub-spacer disposed over the second substrate.

11. The display device as claimed in claim 10, further comprising:
    a second color filter and a third color filter disposed at opposite sides of the first color filter respectively, wherein the first color filter overlaps the second color filter, whereas the first color filter does not overlap the third color filter.

12. The display device as claimed in claim 11, wherein the sub-spacer overlaps the third color filter.

13. The display device as claimed in claim 11, wherein the sub-spacer is disposed between the first color filter and the third color filter, wherein the main spacer has a first height, and the sub-spacer has a second height, wherein the first height is greater than the second height.

14. The display device as claimed in claim 10, wherein the sub-spacer overlaps the one of the two shielding pattern rows.

15. The display device as claimed in claim 10, further comprising:
    a planarization layer disposed over the first color filter, wherein the spacer is disposed over the planarization layer.

16. The display device as claimed in claim 10, wherein the first substrate comprises a data line disposed over the second substrate.

17. The display device as claimed in claim 16, wherein the first color filter extends along the data line.

18. The display device as claimed in claim 11, wherein a portion of a side of the first color filter is curved.

* * * * *